United States Patent Office 3,356,710

Patented Dec. 5, 1967

1

2

3,356,710

ETHYL N-BENZOYL N(2-CHLOROETHYL)CARBAMATE AND PROCESS OF PREPARATION

Leonard Levine, Lake Jackson, Tex., assignor to The Dow Chemical Company, Midland, Mich., a corporation of Delaware No Drawing. Filed Feb. 20, 1964, Ser. No. 346,093
2 Claims. (Cl. 260—471)

ABSTRACT OF THE DISCLOSURE

Ethyl N-benzoyl N(2-chloroethyl)carbamide useful as a pesticide and a method which comprises reacting together benzoyl chloride and ethyl-1-aziridinyl formate in the presence of an inert organic solvent and at a temperature of from 20–150° C.

The present invention is directed to ethyl N-benzoyl N(2-chloroethyl)carbamate having the formula

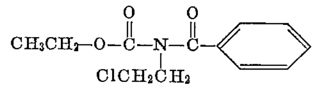

This compound is a clear liquid at room temperature, somewhat soluble in many organic solvents and of low solubility in water. The new compound is useful as a pesticide and insect repellent and is adapted to be employed as the active constituent in compositions for the control of many Acarnia, mollusk, insect, bacterial and plant organisms such as ticks, flies, snails, worms and crabgrass. This compound is also effective in repelling houseflies.

The compound of the present invention can be prepared by reacting together benzoyl chloride and ethyl 1-aziridinyl formate having the formula

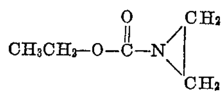

The amounts of the reagent to be employed are not critical, some of the desired product being obtained when employing the reagents in any proportions. In a preferred method of operation, good results are obtained when employing substantially equimolecular proportions of the ethyl 1-aziridinyl formate and the acid chloride. The reaction takes place smoothly between the temperatures of 25° and 150° C. with the production of the desired product. However, the preferred temperature range is between the temperatures of 80° and 120° C. The reaction conveniently can be carried out in an inert solvent such as benzene, toluene, dioxane and aliphatic ethers such as diethyl ether.

In carrying out the reaction the ethyl 1-aziridinyl formate and benzoyl chloride, can be combined in any convenient fashion. However, in a preferred procedure the benzoyl chloride is maintained with stirring at a temperature in the reaction temperature range while the ethyl 1-aziridinyl formate is added slowly portionwise over a short period of time. Following the reaction, the reaction mixture is processed by conventional procedures to obtain the desired product. In a convenient procedure, the low boiling constituents are removed by distillation at reduced pressure, leaving the ethyl N-benzoyl N-(2-chloroethyl)-carbamate product as a residue. This residue may be employed in pesticidal compositions or further purified by vacuum distillation.

Ethyl 1-aziridinyl formate (41 grams; 0.36 mole) was added dropwise to benzoyl chloride (120 grams; 0.86 mole) at 100 to 115° C. over a period of one and one-half hours. During the addition, the reaction mixture was stirred continuously and maintained at a temperature of 100 to 115° C. Following the reaction period, the excess benzoyl chloride was removed by distillation at reduced pressures. The liquid residue remaining after the distillation was fractionally distilled under vacuum and the ethyl N-benzoyl N(2-chloroethyl)carbamate product collected at between 107 and 109° C. under 0.4 millimeter of pressure. Infrared analysis confirmed the identity of the product as ethyl N-benzoyl N(2-chloroethyl)carbamate having a refractive index $n/D$ of 1.5240 at 25° C. The product was found to have chlorine and nitrogen contents of 13.88 percent and 5.48 percent, respectively, as compared with the theoretical contents of 13.82 percent and 5.62 percent, respectively.

The compound of the present invention is useful as an insect repellent and a pesticide for the control of various plant and animal pests. For such uses, the unmodified compound can be employed. Alternatively, the compound can be dispersed on an inert finely divided solid and the resulting preparation employed as a dust. Also, such preparation can be dispersed in water with or without the aid of a wetting agent and the resulting aqueous dispersions employed as sprays. In other procedures, the compound can be employed in oil or other solvent, or as a constituent of a solvent in water or water in solvent emulsion, or an aqueous dispersion thereof which can be applied as a spray, drench, or wash. In representative operations, liquid compositions of ethyl N-benzoyl N(2-chloroethyl) carbamate at concentrations of 1 gram per 100 milliliters of ultimate mixture gave 100 percent kills of lone star tick.

I claim:

1. Ethyl N-benzoyl N(2-chloroethyl)carbamate.

2. A method comprising reacting together benzoyl chloride and ethyl-1-aziridinyl formate in the presence of an inert organic solvent as a reaction medium and at a temperature of from 25–150° C.

References Cited

UNITED STATES PATENTS 3,260,590 7/1966 Fischer ------------ 260—471

LORRAINE A. WEINBERGER, *Primary Examiner.*

L. THAXTON, *Assistant Examiner.*